United States Patent [19]

Hoerig et al.

[11] Patent Number: 4,664,219
[45] Date of Patent: May 12, 1987

[54] MOUNTING OF AN ENGINE

[75] Inventors: Klaus Hoerig, Gross-Gerau; Hans-Joachim Gora, Bischofsheim, both of Fed. Rep. of Germany

[73] Assignee: General Motors Corporation, Detroit, Mich.

[21] Appl. No.: 791,755

[22] Filed: Oct. 28, 1985

[30] Foreign Application Priority Data

Dec. 5, 1984 [DE] Fed. Rep. of Germany ....... 3444296

[51] Int. Cl.⁴ .............................................. B60K 5/12
[52] U.S. Cl. .................................. 180/291; 180/297; 180/312; 180/902; 267/140.1; 280/707
[58] Field of Search ............... 180/291, 292, 297, 300, 180/902, 312; 267/35, 8 R, 140.1; 280/707; 123/192 R; 248/550, 638

[56] References Cited

U.S. PATENT DOCUMENTS

| 2,921,160 | 1/1960 | Lautzenhiser | 280/707 |
| 3,958,654 | 5/1976 | LeSalver | 180/902 |
| 4,531,484 | 7/1985 | Kimura et al. | 267/35 |
| 4,537,275 | 8/1985 | Kimura et al. | 180/300 |
| 4,572,321 | 2/1986 | Morita | 180/312 |

OTHER PUBLICATIONS

European Patent Publication 0,081,055, Kimura, Jun. 15, 1983.

Primary Examiner—David M. Mitchell
Attorney, Agent, or Firm—R. L. Phillips

[57] ABSTRACT

An engine is mounted on a motor vehicle chassis with at least one rubber metal mount acted upon hydraulically to vary its spring rate under the control of a hydraulic control device. The motor vehicle have has at least one wheel mounted in a sprung fashion to the chassis and the engine displacement vibrations are minimized by a displacement transducer placed between the wheel and the chassis that signals the control device to hydraulically increase the spring rate of the engine mount with increasing displacement between the wheel and chassis in advance of wheel movement passed through the chassis affecting the engine in a predetermined frequency range.

1 Claim, 2 Drawing Figures

MOUNTING OF AN ENGINE

TECHNICAL FIELD

The invention pertains to the mounting of an engine on a motor vehicle chassis with at least one rubber metal mount acted upon hydraulically by a control means.

BACKGROUND OF THE INVENTION

This type of mounting is known, e.g., from European Patent Publication No. 0,081,085, which concerns suppressing the transfer of the operating actions of an engine to the chassis, if possible. It is also, in particular, known from this publication that the vibrations of the engine with respect to the body can be sensed by a special sensor which detects the displacement of the rubber metal mount. Special reference in this connection may be made to the description relating to FIG. 5 in the publication cited. According to this, the signal provided by the sensor is then converted by a control means with an electromechanical-hydraulic converter into a hydraulic action upon the rubber metal mount.

The present invention deals with the problem of restricting the displacement vibrations of certain engine in a motor vehicle, which especially occur in the frequency range between 8 and 10 Hz. As these vibrations can constitute a significant deterioration is so-called vibration comfort, i.e., the ride sensation that is based on the absence of vehicle vibration in the above-mentioned frequency range. It must be remembered in this context that these engine-displacement vibrations are produced by road irregularities, since the latter initially impinge upon the wheels which are suspended in a sprung fashion from the body, which in turn then transfers the impact to the engine. These wheel displacement vibrations, however, lie in a frequency range between about 2 and 3 Hz, which is usually not perceived as detrimental to vibration comfort; rather this low-frequency range at about 2-3 Hz is usually interpreted by people as simply the inevitable consequence of road irregularities.

The concern, therefore, is to prevent engine displacement vibrations, particularly those from 8-10 Hz, from penetrating into the rest of the body, from which they can then have a negative effect on vibration comfort. With the above-mentioned state of the art, it is indeed possible to restrict engine-displacement vibrations, but only incompletely, since the sensor monitoring the displacement of the rubber-metal mount in fact requires that the latter be displaced, which simply means that the rubber metal mount nonetheless still permits engine-displacement vibrations. If on the other hand, the control means were so stiff that even the slightest displacements of the rubber-metal mount were prevented by countervailing hydraulic action on the rubber metal mount, the result would simply be a so-called hard engine mounting, which in turn worsens noise comfort.

SUMMARY OF THE PRESENT INVENTION

The basic purpose of the invention is to create a mounting of the type previously mentioned, which more effectively restricts engine-displacement vibrations.

According to the invention, there is provided with a motor vehicle having at least one wheel mounted in a sprung fashion to the chassis, a displacement transducer that is placed between such wheel and chassis and is operatively connected by control means to the rubber metal mount so that as the signal from the displacement transducer increases as a result of a displacement between the chassis an the wheel, the hydraulic action of the control means on the rubber metal mount increases to effectively increase the spring rate thereof. According to the invention, there is, therefore, no longer a displacement transducer between the engine and the chassis as in the cited state of the art, but rather a displacement transducer between the chassis and the wheel. What is monitored is therefore no longer the engine-displacement vibrations themselves, but the excursion of the wheel with respect to the chassis. This exploits the fortunate circumstance that the excursion of the wheel with respect to the chassis precedes that of the chassis with respect to the engine, and that of the engine with respect to the chassis as a result of the wheel excursion. Initially, therefore, the wheel is displaced as a result of a surface irregularity, and only after a time delay with respect thereto is the enging displaced with respect to the chassis. It is consequently possible to produce a suitable hydraulic action on the rubber metal mount even before any significant engine displacement has occured, so that further displacement is restricted in a manner which minimizes as far as possible the transfer of vibrational energy therefrom to the body. To this end, the hydraulic action on the rubber metal mount increases when the signal from the displacement transducer increases as a result of a displacement between the chassis and the wheel; the control means correspondingly acts upon the rubber metal mount on the basis of the signal from the displacement sensor.

The control means is specifically designed so that the displacement transducer is connected to a bandpass filter, which in particular allows only signals representing the undesirable road produced engine displacement vibrations to pass; the bandpass filter is connected to a threshold filter, which only passes signals over a certain amplitude; the threshold filter is connected to an RMS value finder, and the RMS value finder to a servo drive which acts hydraulically on the rubber metal mount. The bandpass filter therefore allows the passage of the undesirable road produced engine displacement vibrations, i.e. vibrations between 8 and 10 Hz, while tuning out tolerable signals from wheel displacement vibrations caused by road irregularities at a frequency of about 2-3 Hz. Higher frequencies, namely those above the undesirable engine displacement vibration are similarly tuned out. The signal output from the bandpass filter is then conveyed to a threshold filter, which only allows signals over a certain amplitude to pass. In particular, this prevents wheel displacement vibrations corresponding to noise, perhaps caused by roughness of the road surface, from activating the control means according to the invention. The threshold value can also be adjustable either manually or in proportion to speed. The remaining usable signal is then conveyed to an RMS value finder. The RMS value is defined in this instance as the root of the time average of the signal passed by the threshold filter. The output signal of the RMS value finder then controls a servo drive which acts hydraulically on the rubber metal mount. This type of servo drive is known in the art, e.g., from the above-mentioned European Publication No. 0,081,085, in this case particularly from FIG. 5, reference numbers 48 and 38, where an electromagnetically actuated pressure cylinder for acting hydraulically on the rubber-metal. In the present invention, the response times of the control components are selected so that the spring characteristic of the engine mount is changed before the engine would be affected by wheel movement passed through the chassis at the undesired frequencies.

DESCRIPTION OF PREFERRED EMBODIMENT OF THE INVENTION

Figure 1:
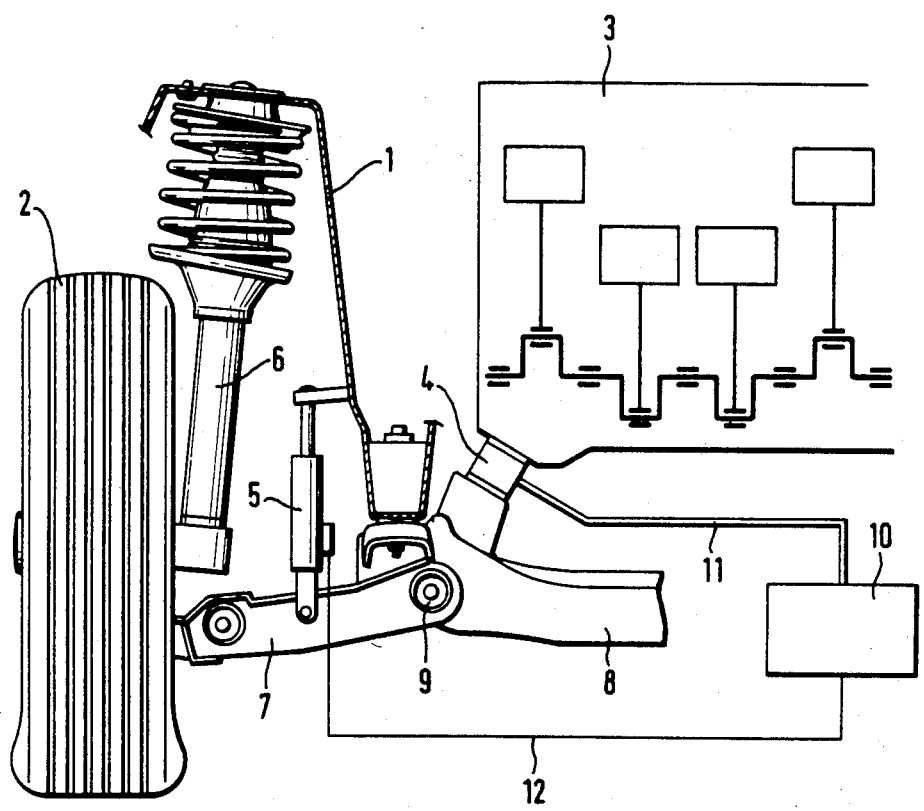

The preferred embodiment of the invention is illustrative with reference to the following figures which show:

FIG. 1: a schematic representation of the mounting of the engine and the wheel with respect to the body in accordance with the invention.

Figure 2:
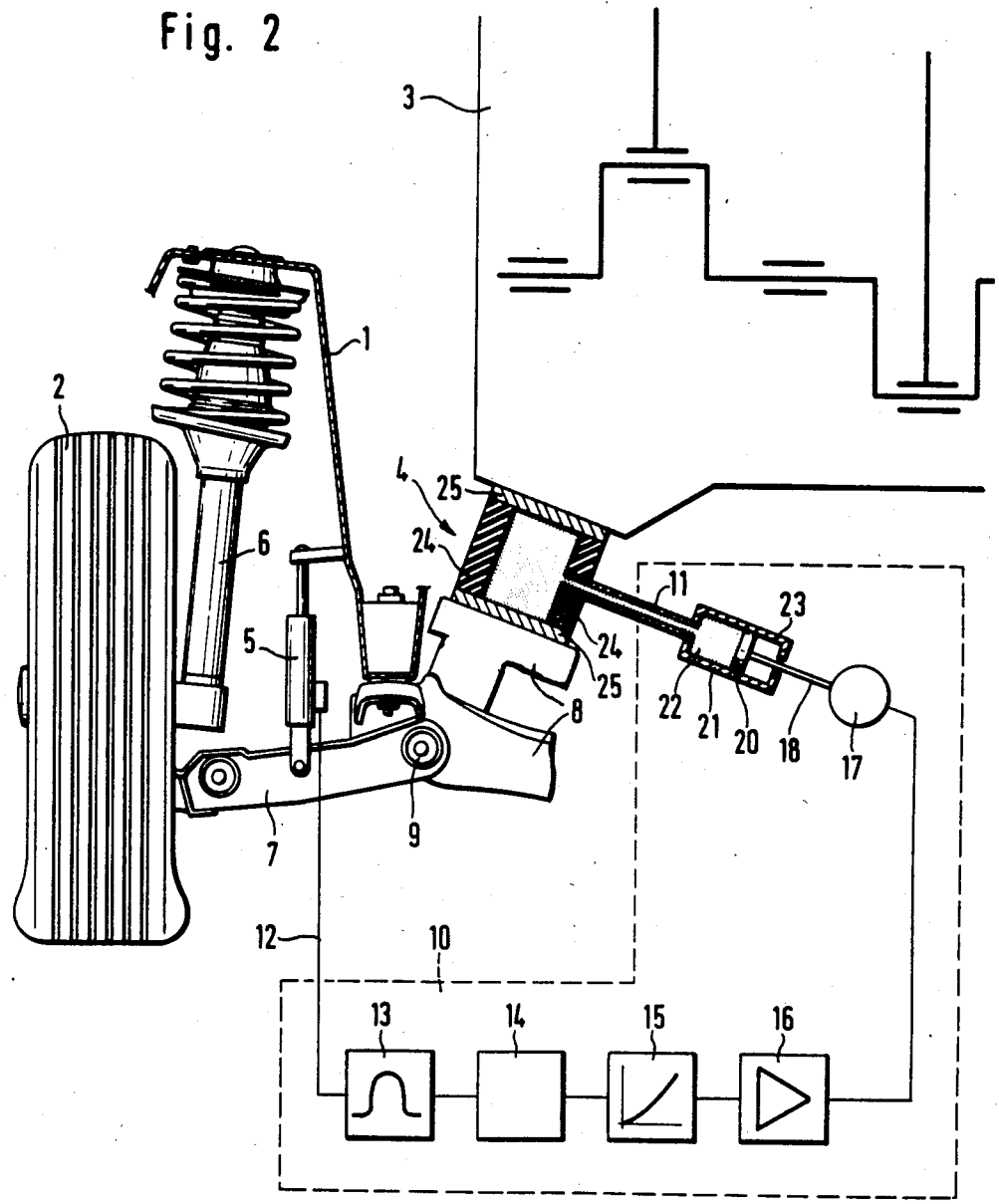

FIG. 2: a basic block diagram of the operative connection between the displacement transducer and the engine mount in FIG. 1.

In FIG. 1, reference number 1 indicates the vehicle body which is solidly attached to the front frame 8. The rubber metal mount of the engine 3, designated the active mount 4, is mounted on the front frame 8. The active mount 4 basically consists of two end plates 25 which close off a hollow rubber element 24. The engine 3 rests on one end plate 25, while the other end plate 25 is attached to the front frame 8. This active mount 4 is controlled by the control means 10 through the control line 11 connected to the interior of the rubber element 24, to which end the control means 10 receives a signal from the signal line 12. This signal is produced by the displacement transducer 5, which senses the displacement between the body 1 and the control arm 7 and with the displacement between the wheel 2 and the chassis 1 therefore also monitored since the wheel 2 is mounted on the control arm 7. The control arm 7 is, in this instance, sprin-mounted with respect to the body 1 by means of a shock absorber strut 6.

FIG. 2 shows the operating principle of the mounting according to the invention by means of a block diagram. The displacement between the control arm 7 and the body 1 is sensed by the displacement transducer 5 and conveyed by means of the signal line 12 to the bandpass filter 13. As mentioned, the displacement between the control arm 7 and the body 1 corresponds to that between the wheel 2 and the body 1. In the bandpass filter 13, essentially only vibrations at the undesirable engine displacement frequencies are allowed to pass, while lower and higher frequencies are tuned out. Noise-type engine displacement signals are tuned out in the threshold filter 14, the result being that the signals emitted from the RMS value finder 15 are only those resulting from actual, i.e., extraordinary wheel displacements, typically caused by road irregularities. The RMS value from the RMS value finder 15 is then fed into an amplifier 16, which if necessary effects another frequency dependent phase shift, as known, e.g., from the above-mentioned European Publication No. 0,081,085. The output signal from the amplifier 16 then actuates the servo drive 17, which moves the piston 20 with respect to the reservoir volume 22 in the pressure cylinder 23 within the cylinder 21 itself in a manner known in the art. As a result, hydraulic fluid is forced out of the reservoir volume 22 through the control line 11 into the interior of the active mount and its spring properties are thereby changed with the result being that the effective spring rate of the mount increases with increasing hydraulic pressure supplied thereto according to the signaling of the transducer 5 as interpreted and conveyed by the control means 10. Moreover, the response times of the bandpass filter 13 and finder 15 are selected so that the spring characteristic (rate) of the mount is changed before the engine would be affected by wheel movement passed through the chassis at the undesired frequencies.

The above described preferred embodiment is illustrative of the invention which may be modified within the scope of the appended claims.

The embodiments of the invention in which an exclusive property or privilege is claimed are defined as follows:

1. In a motor vehicle having a wheel suspended by a spring on a chassis and an engine supported by a rubber metal mount on the chassis and wherein the mount has a spring rate that is hydraulically controlled with a servo characterized by a displacement transducer between the wheel and chassis, and electromechanical control means responsive to an electrical signal from the transducer for increasing the spring rate of the mount with increasing displacement between the wheel and chassis in a predetermined engine displacement frequency range, said control means comprising a bandpass filter that only passes signal frequencies in said predetermined engine displacement frequency range from said transducer, a threshold filter that only passes signal frequencies in said predetermined engine displacement frequency range above a predetermined amplitude from said bandpass filter, a root-mean-square value finder that processes the mean of the signal frequencies passed by said threshold filter to operate the hydraulic servo to change the spring rate of the mount, said bandpass filter and finder having response times such that the spring rate of the mount is changed by said control means before the engine could be affected by wheel movement passed through the chassis in said predetermined frequency range.

* * * * *